United States Patent

Govani

[15] 3,660,079
[45] May 2, 1972

[54] PRECIOUS METALS RECOVERY METHOD

[72] Inventor: Hargovind L. Govani, West Nyack, N.Y.

[73] Assignee: Midland Processing Inc., North White Plains, N.Y.

[22] Filed: Jan. 28, 1971

[21] Appl. No.: 110,593

[52] U.S. Cl. ............................75/109, 75/114 R, 75/115 R, 75/118 R, 75/121 R, 23/87 R, 23/117 R, 75/83 R
[51] Int. Cl. ...................................C22b 11/04, C22b 11/06
[58] Field of Search....................75/118, 121, 109, 114, 115, 75/101 R, 121, 83 R; 23/87 R, 117

[56] References Cited

UNITED STATES PATENTS

| | | |
|---|---|---|
| 1,350,157 | 8/1920 | Horton................................75/118 X |
| 1,624,172 | 4/1927 | Levy.........................................75/118 |
| 2,131,072 | 9/1938 | Reid............................................75/83 |
| 2,214,765 | 9/1940 | Holzwarth................................75/109 |
| 2,221,018 | 11/1940 | Bachman et al........................75/118 |

Primary Examiner—Dewayne Rutledge
Assistant Examiner—G. T. Ozaki
Attorney—Curtis Ailes

[57] ABSTRACT

Photographic emulsion scrap is broken down into a liquid dispersion in a hot solution of an acid such as hydrochloric acid. A finely divided metal powder, such as zinc powder, is added to the liquid dispersion causing a chemical displacement of the silver and other precious metal combined in halide salts within the photographic emulsion scrap to cause the metals to precipitate for mechanical separation from the remaining liquid.

17 Claims, No Drawings

PRECIOUS METALS RECOVERY METHOD

This invention relates to a new process for the recovery of precious metals such as metallic silver from scrap materials, and particularly from scrap materials in which substantial proportions of the metal are in combination as halide salts, such as in photographic emulsion scrap materials.

Scrap photographic emulsion materials from the photographic industry take a number of forms, including batches of photographic emulsion which are separated from, or which never have been combined with a film or paper base, unexposed emulsion on a film base, and exposed emulsion on a film base. The most valuable constituents of these scrap materials are usually the silver, and the film base material.

The most common method for recovery of the silver is simply to burn the scrap emulsion in a furnace. If the film is to be recovered, the emulsion is stripped from the film by a liquid stripping agent before burning. The residue ash left from the burning contains the silver which may be finally recovered in a silver smelter. The smelting step involves heating with a chemical flux to reduce the silver salts to silver metal and to remove the undesired impurities as a slag. This process involves a number of serious problems and disadvantages. For instance, the burning of the emulsion materials produces serious air pollution, since the silver is present in the emulsion in a proportion of only about 1 to 7 percent by weight, and most of the remainder, other than moisture content, consists of organic materials such as animal fat, protein gelatin, natural fine bone and wood pulp. Furthermore, as much as 10 to 20 percent of the silver is lost on the smoke emitted upon the burning operation and therefore cannot be subsequently recovered in the smelter. Because the burning process has been regarded as essentially the only method by which the silver can be recovered, tremendous investments have been made in facilities for burning huge quantities of the photographic emulsion scrap while taking special precautions to try to minimize the resultant air pollution and loss of silver as dust in the flue gases.

Still another problem in the prior art method is that after the emulsion is stripped from the film, in order to provide efficiency in the burning step, it is desirable to separate the solid silver halide-bearing emulsion constituents from the liquid constituents of the combination of the stripping material and the emulsion, drying the emulsion into a cake which can be more effectively burned.

It is one object of the present invention to provide an improved method for salvaging photographic scrap materials in which the step of burning the emulsion materials is avoided completely.

It is another object of the present invention to provide an improved method for recovering silver and other precious metals from photographic scrap materials while avoiding air pollution problems.

It is another object of the present invention to provide an improved method for salvaging silver from photographic scrap emulsion materials which provides a higher yield of silver than prior known methods.

Another object of the invention is to provide an improved method for recovery of photographic scrap materials, including film base materials as well as metals, in which emulsion may be stripped from a film base and in which the active stripping agent is effectively used in later steps in a combined process for stripping the emulsion and recovering the silver from the emulsion.

Another problem in prior art processes for recovery of silver from photographic scrap has been that different processes were required for different types of scrap. For instance, the silver content of exposed scrap film is largely in the form of metallic silver, while the silver content of unexposed scrap film is in the form of silver combined in halides such as silver bromides. Furthermore, if the emulsion is on film, it must be stripped from the film base, but if it exists in bulk form, that step is not necessary. All of these different forms of scrap have required different processing steps in the prior art.

It is an object of the present invention to provide a process which is capable of recovering silver from any of the above forms of photographic scrap, and which furthermore, is capable of recovering silver from batches of photographic scrap which contain any or all of the above forms of photographic scrap in combination.

It is another object of the present invention to provide an improved process for the recovery of silver from photographic emulsion scrap in which the step of separating liquids from the solid and semi-solid portions of the scrap is eliminated.

Still another object of the invention is to provide an improved process for recovering of silver from photographic scrap in which the final smelting step is eliminated.

Other objects and advantages will be apparent from the following description of the invention.

In carrying out the present invention in one preferred form thereof, these is provided a method for the recovery of silver from photographic emulsion scrap including the steps of heating a quantity of the emulsion scrap in acid to at least 150°F. while applying mechanical agitation to thereby form a liquid dispersion of the emulsion in the acid, the acid being a member of the group consisting of hydrochloric acid and sulfuric acid, adding a finely divided metal powder to the liquid dispersion while continuing the mechanical agitation, the metal powder being selected from the group of metals consisting of zinc, cadmium, aluminum, iron, and magnesium, said powder being effective to displace the silver combined in the silver halide salts from the photographic emulsion scrap to thereby cause the silver to precipitate as a solid silver metal, and then separating the liquid from the solid silver precipitate to obtain metallic silver.

A preferred form of the process of the invention is described in somewhat more detail as follows: photographic emulsion scrap is heated in the presence of hydrochloric acid, preferably in a concentration of at least 5 percent, to a temperature of at least about 150° F., and preferably at 170° F. or more. At that temperature, the combination of the heat and the hydrochloric acid causes the emulsion to become a liquid dispersion. The silver halides from the emulsion remain in suspension in the liquid, as they are insoluble in the hydrochloric acid. The next step is to add a quantity of zinc powder, preferably sprinkling the powder into the batch while it is being stirred, and while it is at the advanced temperature indicated above. The heat of the resultant reaction increases the temperature of the liquid dispersion. The result of the reaction is that spongy metallic silver particles precipitate out of the dispersion and settle at the bottom of the container. The remainder of the ingredients remain in solution and can be decanted or otherwise removed from the top of the container.

The spongy metallic silver precipitate is preferably washed with clear water, and filtered, such as on a vacuum belt filter, and the resultant sponge cake is melted in a furnace to make silver ingots or shot. Since the vaporization temperature of zinc (at 907° C.) is below the melting temperature of silver (960.8° C.) any small traces of metallic zinc which may be included in the silver precipitate are effectively dissipated by the melting step. The silver produced by this process is of a commercial grade of purity and can be used directly for many purposes.

The problem of residual metallic zinc in the precipitate is minimized, in the preferred form of the process, by adding sufficient acid to the dispersion to make sure that the dispersion remains acidic to the very end of the process. When this condition is maintained, substantially all of any excess of zinc which has been added combines with the acid to form zinc chloride salts which are soluble and therefore do not remain in the precipitate. Another requirement for obtaining pure silver by the present process is that sufficient zinc powder must be added to completely displace all of the silver in the silver halide salts in the dispersion. Since the zinc atom has a valence of two, and the silver atom has a valence of one, this means adding sufficient zinc powder to provide at least one atom of zinc for every two atoms of silver present in the dispersion. In practice, preferably an excess of 10 percent or more of zinc is added to make sure that all of the silver is displaced, and the excess of metallic zinc is eliminated from the final liquid solution by reaction with the excess of acid which is present, forming the zinc chloride salts as mentioned above.

The amount of zinc necessary for accomplishing the full reaction with the silver halides is preferably determined before the process is carried out by determining the proportion of silver present in the batch of photographic scrap materials which are to be processed. This can be done by analysis of a representative sample of the batch of scrap. An alternative procedure is to add an estimated amount of zinc powder and to then analyze a sample of the precipitated materials in the bottom of the container. If the precipitate includes any silver halide salts then additional zinc must be added, and the process repeated until all of the silver halide salts are eliminated. It is absolutely essential that the liquid mixture remain acid so that any excess zinc is removed as zinc chloride. More acid may be added for this purpose. A simple test for the presence of silver halide salts in the precipitate is accomplished by placing a sample of the precipitate in nitric acid. The silver dissolves, while the silver halides do not.

The amount of acid employed in the practice of the process is not so exactly determinable as is the amount of zinc powder. This is because a portion of the acid is consumed in breaking down some of the organic materials contained in the emulsion in the course of reducing the gelatine constituents of the emulsion to a liquid dispersion. Also, a certain amount of the acid is dissipated as vapor in the preliminary heating step. However, it has been found to be generally satisfactory to provide sufficient acid in a sufficient concentration so as to provide at least one and two-tenths hydrogen chloride molecules for each atom of silver which is being recovered from the emulsion.

The concentration of the hydrochloric acid solution has not been found to be very critical. However, it is believed to be preferable to have a basic concentration of at least 5 percent by weight of hydrogen chloride. Since the commercially available "concentrated" hydrochloric acid is about one-third hydrogen chloride, a 15 percent solution of the concentrated hydrochloric acid provides a net 5 percent concentration of hydrogen chloride in the final solution. Lower concentrations of acid than stated above result in an undesirable slowness in the reaction of the acid with the organics of the emulsion and thus a delay in converting the emulsion to a liquid dispersion. Higher concentrations of the acid may also be employed. However, if the acid concentration is increased too much, then the amount of liquid which is present in the solution is restricted in relation to the amount of the emulsion and it is believed that greater portions of the acid are consumed unnecessarily by the organic constituents of the emulsion, the acid being more reactive with the organics in the higher concentration. Also, a higher concentration of acid is more corrosive to the walls of the reaction vessel. Excellent results have been obtained with solutions of 20 percent concentrated hydrochloric acid (7% HCl solution). Where the emulsion scrap has a high water content, often as high as 80 percent, concentrated acid may be used, the dilution by the water content of the scrap being sufficient.

While we are not absolutely certain of the reactions which take place in the present process, it is believed that they can be represented by the following reaction formula:
$24 HCl + 20 AgBr + 11 Zn + (H_2O + Organics) \longrightarrow$
$20 Ag + 10 ZnBr_2 + ZnCl_2 + (HCl + H_2O + H + N + CO_2 + Organics)$ In addition to the above constituents, it is believed that hydrogen bromide (HBr), and silver chloride (AgCl) undoubtedly exist as intermediate reaction products, at least in trace amounts. In the above reaction statement, the quantities of the constituents shown in both sides of the reaction formula within parentheses are not known precisely. It is believed that a substantial proportion of the hydrochloric acid initially added combines with the oxygen of the organics to form water. Accordingly, the organics in the final products are not the same organics as existed in the original constituents, and furthermore, there is more water present in the final product than there is initially. As a matter of fact, when hydrochloric acid and zinc are employed in the process of the present invention, only trace amounts of the original complex organic compounds appear to remain. It appears that the organics are substantially broken down into basic elements and simple compound constituents such as nitrogen, hydrogen, water, and carbon dioxide. The presence of both the hydrochloric acid and the zinc appear to promote this break down of the organics. As shown by the illustrative examples given below, this break down does not appear to be quite as effective with either a different acid, or a different metal powder.

The total amounts of acid and zinc powder are not critical as long as they are present in at least the proportions suggested above. As a practical matter, a more substantial excess of zinc powder and acid is preferred because it provides a more complete assurance that the reactions go to completion, with substantial elimination of any trace amounts of silver halides in the solution. Accordingly, the major requirements are that there must be enough zinc powder added to displace all of the silver, and there must be enough acid present to combine all of the residual zinc into soluble zinc chloride salts. It is quite practical to practice the present process by stepwise additions of acid to maintain the acidity of the liquid dispersion, while adding zinc powder in steps until all of the silver halide salts are observed to have been eliminated. However, the preferred form of the process is to have a preliminary determination of the amount of silver present in the scrap, and to add sufficient acid and zinc powder to carry the process through to completion without intermediate steps of testing for the presence of silver halides.

It has been found to be essential in the practice of the process that the liquid suspension of the emulsion in the acid solution should be at a temperature of at least 150° F., and preferably above 170° F., before the zinc powder is added because it has been found that the reacting liquids "boil over" if the reaction is carried out at lower temperatures. This is thought to be caused by the gases which are generated by the reactions between the hydrochloric acid and the organics. At lower temperatures these gases cannot escape easily through the gelatinous portions of the suspension. The result is that suds are generated. However, at the higher temperatures, the gelatine breaks down and the gases can escape easily without making a suds or foam.

In one form of the process of this invention, the acid solution may be employed to strip the emulsion from a film base prior to the addition of the zinc. In this version of the process, the hydrochloric acid solution is preheated to about 170° F., or higher, and then the emulsion coated film, preferably in chopped form, is added to the hot acid at a substantially constant rate. This is preferably carried out while the acid is being mechanically agitated. Within a few minutes, the film emulsion is stripped from the film and forms a suspension in the hydrochloric acid solution. The film base is then separated from the suspension by filtering the suspension through a fine screen. Since the initial volume of the emulsion combined with the film base is quite high in relation to the volume of the acid solution, a preferred procedure is to perform the film stripping step repeatedly with a single acid solution batch, repeatedly stripping a small batch of film and filtering the film base out, and then stripping another small batch of film, and repeating until the acid is effectively "loaded" with emulsion. The remainder of the process is then the same as before, the zinc powder being added and the metallic silver precipitated.

The following are specific examples of the practice of the present invention:

EXAMPLE I

A photographic emulsion which contains 3 percent by weight of silver, 80 percent water, and which is free of film, is processed as follows. One hundred parts of the emulsion are heated with 4 parts by weight of concentrated hydrochloric acid (a 33% HCl solution). The heating is continued to a temperature of substantially 150° F. with mechanical agitation until the combination of the heat and the action of the hydrochloric acid causes the emulsion to become thoroughly dispersed in the liquid, the water from the emulsion diluting the acid. One and one-half parts by weight of zinc powder are then added gradually by sprinkling the zinc powder into the mixture while continuing the mechanical agitation. The heat of the resultant reaction is observed to increase the temperature of the liquid dispersion, and metallic silver particles are precipitated, and settle to the bottom of the container. The remaining liquid is otherwise substantially a clear solution which is decanted or otherwise removed from the container. The metal silver precipitate remaining in the container is washed and filtered and is found to be substantially pure silver.

EXAMPLE II

The silver precipitate from Example I is dried and then melted. The melting is carried out in an oxygen protected atmosphere to prevent porosity in the silver and oxidation of the silver due to oxygen uptake. The melting step serves to remove any traces of residual metallic zinc since zinc has a vaporization temperature which is below the melting temperature of silver. The molten silver is then cast in the form of ingots or pellets for storage and later use.

EXAMPLE III

A sample of a batch of unexposed X-ray film to be processed is tested by known laboratory procedures to determine the percentage of silver content. The silver content is determined to be approximately 3 percent of the total weight of the unprocessed film. The film is then chopped up into pieces having a maximum dimension of approximately one-quarter of an inch.

Eight hundred parts by weight of hydrochloric acid solution are then prepared having a content of 20 percent concentrated hydrochloric acid (7% HCl). This acid solution is heated to 180° F. and 100 parts of the chopped unexposed film is then added while the solution is mechanically agitated. Within a few minutes, the emulsion is stripped from the film. The pieces of stripped film material are then strained out of the dispersion by passing the entire dispersion through a screen. Another 100 parts of chopped film are then added to the acid solution-dispersion and the emulsion is stripped from the second batch of chopped film and the film removed by straining the dispersion through a screen. This step is repeated again and again until 25 batches of 100 parts of chopped film have been processed and stripped of emulsion. Thirty-eight parts, by weight, of zinc powder are then added to the dispersion, causing the precipitation of substantially pure silver particles from the dispersion.

In this example, as the stripped chopped film is removed from the acid solution-dispersion, it necessarily carries some of the liquid with it, and that liquid includes some of the silver halides from which silver is desired to be recovered. Accordingly, in order to improve the efficiency of the process, it is preferred to separate as much of the liquid as possible from the stripped film by use of a conventional vibrating screen, and to rinse each 100 part batch of chopped film at least once and preferably twice with about 20 parts of water each time, following each rinse by treatment on the vibrating screen to separate as much liquid as possible from the chopped film. The liquid effluent from the first rinse is preferably saved and part of it is used as make-up liquid in the hydrochloric acid solution, additional concentrated hydrochloric acid being mixed with this effluent to provide the 20 percent concentration. The remainder of this rinse liquid is preferably saved and used in preparing the acid solution for the next batch. The effluent from the second rinse is preferably filtered through a filter press to remove any residual silver halides, and then discarded. The filtrate from the filter press may then be added to a later batch of emulsion under treatment by the process, and the silver thus recovered therefrom. When using these rinsing steps, an initial amount of 500 parts of hydrochloric acid solution is sufficient, since the volume is supplemented by the first rinse liquid.

One of the most interesting and important aspects of the present invention is that it is usable for the recovery of silver from many different kinds of photographic scrap material without the necessity for any important changes or modifications to accommodate for the differences in the scrap starting material. Thus, for instance, the emulsion scrap may be unexposed film, exposed film, or bulk emulsion which is not combined with a film. The emulsion which is on film must be stripped from the film, and the exposed film contains the silver in metallic form rather than in combination in halide salts. It is not always convenient to separate the different classes of photographic scrap and they do get to be commingled in some instances. Accordingly, with the process of the present invention, all of the scrap can be processed together in the same acid solution. Although the silver content of exposed film exists as metallic silver, it is intimately associated with the emulsion, and the problem is to separate it from the emulsion in an efficient manner. With such scrap, the hydrochloric acid is believed to simply convert the silver to silver chloride, and the zinc is believed to displace the silver in this halide salt to cause the precipitation of pure silver, just as in the process as previously described. Thus, pure silver is obtained efficiently which is completely separated from the remainder of the emulsion.

EXAMPLE IV

Example III is repeated, with the change that 30 parts of the 100 parts of each batch of film are exposed film while the remaining 70 parts are unexposed film. The process is carried out in exactly the same way and with substantially the same results. Any differences in the chemical intermediate products and reactions are not apparent, the end results appear to be substantially identical.

As appears from the foregoing, the present invention is operable for the efficient recovery of silver from scrap in which the silver is mechanically or chemically combined, or mechanically and chemically combined intimately with other materials. It is particularly effective for the recovery of silver from silver halides in virtually any form. Some of the forms of silver halide scrap may be referred to as photographic slurry, sludge, sweeps, spray-dried dust, and halide mud. Many of these forms of scrap exist as intermediate products, or by-products of prior art methods of salvage of photographic scrap materials. Accordingly, once the present invention is widely used, in all of its aspects, these forms of silver halide scrap will no longer be available. However, they serve to illustrate the versatility of the possibilities of the present invention. For instance, various processes are presently used for the removal of photographic emulsion from film. Some of these use caustic soda to break down the emulsion, and others use an enzyme material in which the enzymes break down the organics of the emulsion to separate it from the film. Instead of burning, the stripped emulsion material may be left in liquid form and processed for the recovery of silver by the present process, or it may be dried first. In either case, the present process is very effective for recovering the silver from the silver halides in a very efficient manner. Still another presently important source of silver halide scrap material results as a by-product from the conventional method of burning photographic emulsion scrap to recover the silver therefrom. Substantial amounts of silver halide are lost in the vapors expelled from the burning. In order to minimize this loss, it is conventional to employ precipitators to recover some of the silver halides from the flue gases in the form of a fine dust. This fine dust can be processed very efficiently by means of the present process to recover the silver therefrom.

EXAMPLE V

Example I is repeated employing a raw material which is a photographic emulsion waste slurry containing about 5 percent by weight of silver and resulting from stripping of the emulsion from film by a hypo solution. The following changes are made in the process: 6.5 parts by weight of concentrated hydrochloric acid are used and the heating is continued to a temperature of 180° F. before the addition of the zinc powder. Two parts by weight of zinc powder are then employed. Very good results are obtained.

EXAMPLE VI

The process is carried out employing a raw material which is a centrifuged photographic sludge containing about 50 percent water and 25 percent silver by weight. The raw material also includes approximately 1 percent of palladium present in combination in a palladium compound. One hundred parts of the sludge are heated with 200 parts of a hydrochloric acid solution having a content of 20 percent concentrated hydrochloric acid. The slurry is heated with the acid, with mechanical agitation, to a temperature of 180° F., at which temperature the sludge forms a substantially uniform dispersion in the acid solution. Ten parts of zinc powder are then added gradually by sprinkling into the mixture while continuing the mechanical agitation. This causes a reaction in which a precipitate is formed. The precipitate is found to be in a spongy form which may be filtered and dried, and may be referred to as a "cement." This cement material is found to contain about 85 percent silver and about 3.5 percent palladium. The balance of the cement is believed to include film residues, silica, sodium compounds, and traces of organic materials.

The cement is then melted in a furnace with a suitable flux for excluding atmospheric oxygen and the resultant metal is found to have a composition of 95 percent silver, almost 4 percent of palladium, and about 1 percent of impurities. The remainder of the residues from the cement material comes out in combination with the flux as a slag from the melting step. The silver and the palladium can be further separated and refined, if desired, by conventional electrolysis methods.

This example illustrates that precious metals other than silver can be recovered by the process of the present invention. Thus, small amounts of compounds of other precious metals, which may be present in photographic emulsion scrap, or in other metal halide scrap materials, may be recovered along with the silver and economically concentrated for profitable recovery. This statement applies to virtually all of the precious metals which are on the negative side of the displacement series of elements. In addition to silver and palladium, it applies to bismuth, antimony, ruthenium tantalum, iridium, platinum, osmium and gold.

EXAMPLE VII

A photographic emulsion sludge obtained by enzyme stripping of the emulsion from film, and containing about 30 percent silver by weight was processed by adding 100 parts of the sludge to 250 parts of a 20 percent hydrochloric acid solution while heating and mixing. After the temperature reaches 180° F., 20 parts of powdered zinc are added gradually by sprinkling the zinc powder into the mixture while continuing the mechanical agitation. The result is the precipitation of substantially pure silver, as before. By means of other tests, it has been determined that this enzyme sludge must be heated to at least about 170° F. in order to obtain satisfactory operation of the method and precipitation of silver. This is higher than with other materials. As previously stated, other materials will react adequately at temperatures above 150° F. It is believed that this higher temperature is required in order to break down the enzymes in the sludge. It also appears that higher proportions of acid and zinc are required to assist in the breakdown of the enzymes.

EXAMPLE VIII

A spray dried dust, which is a product from caustic soda stripping of emulsion from unexposed film, and containing 20 percent silver by weight, is processed by placing 100 parts by weight of the spray dried dust in 400 parts of a hydrochloric acid solution containing 20 percent concentrated hydrochloric acid. The mixture is heated to 180° F. with mechanical agitation, after which 10 parts of zinc powder are added gradually, with the result that silver is precipitated out as before. In this example, a substantial excess of acid is employed, the excess being required to neutralize the caustic soda (sodium hydroxide) residues in the dust and to make the solution acidic.

EXAMPLE IX

One hundred parts of silver halide containing precipitator dust are processed by addition to 200 parts of a 20 percent concentrated hydrochloric acid solution. The combination is heated with mechanical agitation to 180° F. and then 10 parts of zinc powder are added gradually while continuing the mechanical agitation. The silver precipitates out as in the prior examples.

Preliminary analysis showed that the precipitator dust contained 20 percent by weight of silver combined in the form of silver halides, the remainder including iron, organics, sodium compounds, and silica.

All of the above examples relate to the use of hydrochloric acid and zinc powder with various raw scrap materials in the process of the present invention. While hydrochloric acid, and zinc powder have been found to be the most effective materials for the practice of the process, and are therefore the favored materials, it has been found that similar results can be obtained employing other acids, and other metal powders for displacement of the silver from the silver halides. The following examples illustrate the use of these other materials.

EXAMPLE X

Example I is repeated substituting concentrated sulfuric acid ($H_2SO_4$) for the concentrated hydrochloric acid. One hundred parts by weight of the photographic emulsion are heated with 5 parts by weight of concentrated sulfuric acid. The heating is continued to a temperature of 180° F. with mechanical agitation. The combination of the heat and the acid causes the emulsion to become thoroughly dispersed in the liquid. However, it was observed that the breakdown and dispersion of the emulsion did not occur as rapidly as it does when hydrochloric acid is used for this purpose. Three parts of zinc powder are then added to the dispersion with vigorous agitation. As a result, the silver precipitates from the dispersion, as before. However, the organic materials from the emulsion do not appear to break down as effectively as they do in the presence of the hydrochloric acid. As a result, rubbery-like materials precipitate out with the metallic silver and these rubbery materials must be separated from the silver by burning which takes place in connection with the final silver melting step. Furthermore, the precipitate is a fluffy and light mixture which is much more difficult to filter than is the precipitate obtained when hydrochloric acid is employed.

EXAMPLE XI

The process of Example I is repeated with the following changes: the heating is continued to a temperature of 180° F. before adding the metal powder. Instead of zinc powder, 2 parts by weight of commercially available cadmium sponge clippings are employed. The results are substantially the same as they were with the zinc powder, with the exception that the cadmium sponge clippings were not quite as rapid to react in the process because of the physical form of the material.

EXAMPLE XII

Example I is again repeated with the following changes: the heating is continued to a temperature of 180° F. before adding the metal powder, and then 1½ parts of iron powder are added instead of the zinc powder. The results were much the same as before, except that the reaction with the metal powder was much slower, even with vigorous agitation, and a longer period was necessary for the excess of acid to consume the excess of iron powder.

EXAMPLE XIII

Example I was repeated with the following changes: 5 parts, instead of 4 parts, of acid were employed. The heating is continued to 180° F. before adding the metal powder, and one-half part of aluminum powder is used instead of the zinc. Using this material, the reaction did not proceed nearly as well as it had with the other metal powders. In particular, there was a large generation of foam, indicating that the organics were not reduced, as they are with the zinc.

EXAMPLE XIV

Example I is repeated with the following changes: the heating is continued to 180° F. before adding the metal powder, and one-half of one part of magnesium powder is used instead of the zinc. The results are substantially the same as with the aluminum in Example XIII. Additionally, the magnesium powder is observed to float on the top of the liquid rather than becoming thoroughly wetted and descending into the liquid where it may react.

EXAMPLE XV

The process of Example I is repeated. Then the clear liquid which is removed from the container after precipitating the metal silver is further treated for recovery of the zinc as follows: Sodium hydroxide is added to the liquid to thereby convert the zinc salts present in the liquid to sodium salts and to cause the formation of zinc hydroxide as a precipitate. The liquid is then separated from the zinc hydroxide precipitate and the zinc hydroxide is smelted to recover the zinc therefrom.

While this invention has been shown and described in connection with particular examples, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. A method for the recovery of precious metals from photographic emulsion scrap comprising the steps of heating a quantity of the emulsion scrap in acid to at least 150° F. while applying mechanical agitation to thereby form a liquid dispersion of the emulsion in the acid,
   the acid being a member of the group consisting of hydrochloric acid and sulfuric acid,
   adding a finely divided metal powder to the liquid dispersion while continuing the mechanical agitation,
   the metal powder being selected from the group of metals consisting of zinc, cadmium, aluminum, iron, and magnesium,
   said powder being effective to displace the precious metals combined in halide salts from the photographic emulsion scrap to thereby cause the precious metals to precipitate as solid metals,
   and then separating the liquid from the solid metals.

2. A method as claimed in claim 1 wherein
   said acid is hydrochloric acid and
   said metal powder is zinc powder.

3. A method as claimed in claim 2 wherein
   the precious metals contained within the photographic emulsion consist essentially of silver and palladium.

4. A method as claimed in claim 2 wherein
   the precious metals contained in the photographic emulsion scrap consist primarily of silver in combination in silver halides.

5. A method as claimed in claim 4 wherein
   additions of said zinc powder are made while maintaining the acidity of the liquid dispersion by additions of hydrochloric acid when needed until no silver halides remain within the dispersion to thereby obtain a substantially complete conversion of the silver halides to zinc halides and a maximum yield of metallic silver.

6. A method as claimed in claim 4 wherein
   an amount of zinc powder is added which is in excess of the amount needed to provide one zinc atom for every two silver atoms present to assure a complete displacement of all of the silver in the silver halides by zinc,
   and sufficient hydrochloric acid is employed to provide a final dispersion which is acidic to assure a substantially complete combination of all remaining zinc present into soluble zinc halide salts.

7. A method as claimed in claim 4 wherein
   said emulsion scrap includes film material coated with the emulsion and wherein
   the initial heating step is carried out to at least 170° F. while applying mechanical agitation to thereby strip the emulsion from the film as a combination step with the forming of a liquid dispersion of the emulsion in the acid,
   and wherein there is provided the additional step of straining the dispersion to remove the stripped film therefrom prior to the step of adding the finely divided metal powder.

8. A method as claimed in claim 7 wherein
   the emulsion-bearing film is chopped prior to processing.

9. A method as claimed in claim 7 wherein
   the film includes unexposed film.

10. A method as claimed in claim 7 wherein
    the film includes exposed film.

11. A method as claimed in claim 7 wherein
    a number of successive batches of film material coated with emulsion are added to the acid solution for stripping of the emulsion and then strained from the dispersion before the step of adding the metal powder.

12. A method as claimed in claim 7 wherein
    the stripped film removed from the liquid dispersion is rinsed at least once and the resultant rinse liquid is used as make-up water to maintain the volume of the solution,
    any excess being saved for use as part of the acid solution for subsequent batches.

13. A method as claimed in claim 12 wherein
    the stripped film material is rinsed a second time,
    and the liquid resulting from the second rinse is filtered to remove residual silver halides therefrom for subsequent silver recovery.

14. A method as claimed in claim 4 wherein
    the solid silver precipitate is washed and drained at least once after the initial separation of the liquid from the solid precipitate to thereby remove residual amounts of impurities remaining in the wet precipitate.

15. A method as claimed in claim 4 including
    the additional step of melting the solid silver precipitate while protecting the molten metal from atmospheric oxygen,
    and then casting the liquid metal in usable solid metal castings.

16. A method as claimed in claim 15 wherein
    the solid silver precipitate is dried before the melting step.

17. A method as claimed in claim 4 including
    the additional step of adding sodium hydroxide to the liquid which has been separated from the solid silver precipitate to thereby convert the zinc salts present in the liquid to sodium salts and to cause the formation of zinc hydroxide as a precipitate,
    and then separating the liquid from the zinc hydroxide precipitate and smelting the zinc hydroxide to recover the zinc therefrom.

* * * * *